3,271,173
PREPARATION OF ALUMINA MONOFILAMENTS
Robert J. Lockhart and Eugene Wainer, Shaker Heights, Ohio, assignors to Horizons Incorporated, a corporation of New Jersey
No Drawing. Filed Mar. 31, 1965, Ser. No. 444,442
6 Claims. (Cl. 106—65)

This invention relates to alumina monofilaments of superior physical properties. More particularly, it relates to the incorporation of lithium containing compounds in monofilaments of alumina, such as those described in French Patent 1,316,535, which issued on an application corresponding to copending United States patent application Serial No. 72,277, filed November 29, 1960, and issued April 27, 1965, as United States Patent 3,180,741, and later applications describing improvements thereon.

The processes described in these applications include:

(1) Preparation of a stable solution or small particle sol based on an aluminum salt of a mixture of organic acids;

(2) Treatment of the above composition to yield a viscous polymeric material from which monofilament can be successfully spun;

(3) Adjustment of the temperature of the viscous material to a temperature at which the rate of change of its viscosity per unit of temperature is minimal;

(4) Extrusion of the viscous polymeric material through a spinnerette, while it is maintained at the required temperature, into a fluid of suitable composition;

(5) Stretching or drawing of the freshly spun filament immediately after it emerges from the orifices in the spinnerette plate; and (6) Final consolidation of the filament by firing the same under conditions such that the organic matter present in the "green" fiber is removed and the filament or fiber develops the desired microcrystalline refractory oxide physical and chemical structure.

Although zirconia and similar inorganic oxides have been processed into strong flexible monofilaments by the techniques described, the alumina fibers obtained have not been found to exhibit the properties which can be achieved with alumina produced by the procedures described in United States Patents 3,023,115 and 3,077,380, issued to one of the present applicants and others on February 27, 1962, and February 12, 1963, respectively.

While not wishing to be bound by any specific theoretical explanation it appears that when aluminum oxide filaments are produced from a spinning solution without doping, i.e. without the addition of a lithium compound, the first crystal structure which develops on firing is gamma alumina. As the firing temperature is increased the gamma alumina manifestation transforms into alpha alumina starting at temperatures as low as 750° C. The transformation is normally complete by the time the temperature reaches a range of 1100° C. to 1200° C. In going through this transformation the originally transparent fibers become opaque and coarsely crystalline and are also extremely brittle and weak. This greatly limits their usefulness particularly since the onset of alpha alumina crystallization can proceed on firing to the point where microscopically visible alpha alumina crystals grow completely across the diameter of the fiber making it extremely difficult to maintain the integrity of the fibers.

The use of lithium doping with or without the addition of manganese salts eliminates this difficulty in that the transparency and toughness of the fibers is maintained through temperatures at least as high as 1540° C. and in some instances the structure was found to be stable at 1700° C. Transparency, toughness and flexibility are retained, possibly as a consequence of the elimination of formation of the alpha alumina structure.

A principal object of the present invention is to prepare monofilaments of alumina which are not susceptible to the loss of strength and stability experienced upon heating prior art monofilaments to temperatures sufficient to transform gamma alumina to alpha alumina.

This and other objects which will become apparent from the description which follows are accomplished by doping the filaments with suitable amounts of lithium, with or without the addition of small amounts of manganese salts.

The viscous liquid from which the desired alpha alumina fibers are ultimately obtained is based on aluminum salts of organic acids. Initially a dilute solution is prepared in which the aluminum is provided as a salt of a suitable carboxylic acid. Suitable acids are aliphatic mono- and poly-carboxylic acids having a dissociation constant of at least $1.5 \times 10^{-5}$. The aluminum salts are either completely water soluble or are rendered soluble by the presence of sufficient acid. In the present process, the preferred aluminum salt is a salt of acetic and formic acids called aluminum formoacetate and having the chemical formula $Al(CHO_2)(OH)(C_2H_3O_2)$.

The following examples will serve to further illustrate the invention and are intended to be exemplary of preferred modes of practicing the invention.

EXAMPLE 1

For each gallon of spinning solution desired the following ingredients were poured into a glass vessel in the order listed:

| Ingredient | Weight (grams) | Weight percent |
| --- | --- | --- |
| Distilled Water | 1,870 | 31.7 |
| Tartaric Acid, Reagent Grade | 600 | 10.1 |
| Aluminum Formoacetate | 3,000 | 50.9 |
| Oxalic Acid, Reagent Grade | 102 | 1.7 |
| Lithium Bromide, Reagent Grade | 330 | 5.6 |
|  | 5,902 | 100.0 |

It has been found necessary to add the lithium compound after the tartaric acid and aluminum formoacetate to prevent the formation of an insoluble white precipitate.

After all of the ingredients had been added, the batch was heated to 60° C. with vigorous stirring and mixed 30 minutes at this temperature. The solution was then vacuum filtered through two layers of glass cloth to remove solid residue. A bell jar is then placed over the vessel, and a vacuum of approximately 2 inches of mercury is established to concentrate the solution to a high viscosity. Heat is supplied by a glass-braid-insulated electrical heating tape wrapped around the outside of the glass jar. In each of 3 or 4 cycles, the solution is heated to 50° C. in air, then evacuated until the cooling effect of the evaporation of the water reduces the temperature to 25° C. When the viscosity of the solution approaches a value of 220,000 centipoises, corrected to 25° C., the material is poured into a large glass bottle and tightly capped. For one to two days the liquid appears to be non-homogeneous with respect to viscosity. The bottle is occasionally tumbled to mix up the contents, and the viscosity is adjusted as required to attain the desired value. The solution may be used for spinning any time after completion of the viscosity adjustments, up to the time when it becomes opaque six to eight weeks later.

The solution is poured into the reservoir of a spinning apparatus and left overnight to allow the entrained air bubbles to rise to the surface. The apparatus is then started to pump the liquid through a sintered-metal filter into the spinning-head chamber. The spinning head is maintained at a temperature of 35 to 40° C. to control the temperature (and thus the viscosity) of the spinning solution inside for optimum fibering characteristics. The temperature control is achieved by circulating water through a container in which the spinning head is mounted. The solution is extruded through 4 spinnerettes at a system pressure of 400 to 600 lb./in.² The spinnerettes each have 15 holes 127 microns in diameter arranged on two concentric circles. The wet filaments just leaving the spinnerette orifices are stretched to several times their initial length by winding them on a rotating drum at a rate faster than that at which they are being extruded. The degree of stretching is limited by the tenacity of the material. With the solutions and spinnerettes now in use, the maximum elongation is about 19 times which results in a green diameter of 29 microns. Between the spinnerettes and the takeup drum, the filaments pass through a drying tower containing heated air at 45 to 50° C. at the bottom and 30 to 35° C. at the top. Stretched filaments are colorless, crystal clear and very flexible.

The filaments are then fired in a two step process as described in the aforesaid patent, the first step being at a temperature up to about 565° C. whereby all organic material is eliminated from the filaments and the second firing being at about 1370° C. After the fibers cool, they are transparent, strong and flexible.

EXAMPLE 2

The procedure described in Example 1 was followed except that the oxalic acid was omitted from the spinning solution. The resulting fibers appeared to exhibit fewer fractures when fired at 1370° C.

EXAMPLE 3

The procedure described in Example 1 was repeated except that 26 grams of an 80% aqueous solution of manganese nitrate was added after the oxalic acid addition. The handling strength of the filaments after firing was superior to that obtained in either Examples 1 or 2.

EXAMPLE 4

The procedure in Example 1 was followed except that 20 grams of an 80% aqueous manganese nitrate solution was added before the lithium bromide. Again the filaments had improved handling strength after firing.

Proportions

The spinning solution described above represents a preferred composition. The several constituents can be varied as follows (weight percent, balance distilled water, lithium salt and manganese salt if present):

| | |
|---|---|
| Tartaric acid | 5 to 15, prefer 9 to 12 |
| Aluminum formoacetate | 40 to 60, prefer 47 to 52 |
| Oxalic acid | Up to 3, prefer 0.5 to 2 |

The amount of lithium added will depend on the particular compound used, the chloride, iodide, nitrate or other relatively soluble salt compounds all being suitable, the amount of lithium added ranging from a minimum amount sufficient to produce $Li_2O \cdot 5Al_2O_3$ up to 50% in excess of this amount. Hence with the composition given using LiBr 5.6 to 7.8% addition is suitable.

When a manganese salt is added it should amount to between 0.2 and 4% of the alumina in the final fiber.

X-ray diffraction tests were run on a series of fibers heated to maximum temperatures between 700 and 1570° C. The results indicated that a mixture of lithium spinel ($Li_2O \cdot 5Al_2O_3$) and a lesser quantity of $Li_2O \cdot Al_2O_3$ were formed between 700 and 800° C. As the firing temperature increased, the powder patterns indicated higher states of crystallinity with a diminishing proportion of $$Li_2O \cdot Al_2O_3$$

At 1570° C. the sample appeared to be pure lithium spinel.

Having now described the invention it is not intended that it be limited except as may be required by the appended claims.

We claim:

1. A spinning solution for the production of inorganic oxide monofilaments comprising:

| | Amount |
|---|---|
| Distilled water | Balance. |
| Tartaric acid | 5 to 15 weight percent. |
| Aluminum formoacetate | 40 to 60 weight percent. |
| Oxalic acid | Up to 3 weight percent. |
| Lithium salt | From a minimum amount which is sufficient to produce $Li_2O \cdot 5Al_2O_3$ when reacted with said aluminum formoaceate up to 1.5 mols for each 5 mols of Al in said aluminum formoaceate. |

2. A spinning solution for the production of inorganic oxide monofilaments comprising:

| | Amount, wt. percent |
|---|---|
| Distilled water | 31.7 |
| Tartaric acid | 10.1 |
| Aluminum formoacetate | 50.9 |
| Oxalic acid | 1.7 |
| Lithium salt | 5.6 |

3. The composition of claim 1 wherein the lithium salt is lithium bromide.

4. The composition of claim 1 including in addition from 0.2% up to 4% by weight of a manganese salt, based on the weight of alumina in the final final fiber.

5. An alumina monofilament stabilized by the incorporation of $Li_2O$ therein in an amount sufficient to form $Li_2O \cdot 5Al_2O_3$ when said monofilament is fired above 1100° C.

6. A monofilament having a diameter of about 20 microns and consisting essentially of $Li_2O \cdot 5Al_2O_3$ spinel.

References Cited by the Examiner

UNITED STATES PATENTS

| | | | |
|---|---|---|---|
| 3,023,115 | 2/1962 | Wainer et al. | 106—65 |
| 3,077,380 | 2/1963 | Wainer et al. | 106—65 |
| 3,180,741 | 4/1965 | Wainer et al. | 106—65 |

TOBIAS E. LEVOW, *Primary Examiner.*

J. POER, *Assistant Examiner.*